United States Patent
Sun et al.

(10) Patent No.: US 10,768,879 B2
(45) Date of Patent: Sep. 8, 2020

(54) IMAGE PROCESSING METHOD AND APPARATUS, VIRTUAL REALITY APPARATUS, AND COMPUTER-PROGRAM PRODUCT

(71) Applicants: BEIJING BOE OPTOELECTRONICS TECHNOLOGY CO., LTD., Beijing (CN); BOE Technology Group Co., Ltd., Beijing (CN)

(72) Inventors: Yukun Sun, Beijing (CN); Hao Zhang, Beijing (CN); Lili Chen, Beijing (CN); Jinghua Miao, Beijing (CN); Xuefeng Wang, Beijing (CN); Wenyu Li, Beijing (CN); Bin Zhao, Beijing (CN); Xi Li, Beijing (CN); Lixin Wang, Beijing (CN); Jianwen Suo, Beijing (CN); Jinbao Peng, Beijing (CN); Qingwen Fan, Beijing (CN); Yali Liu, Beijing (CN); Yu Lei, Beijing (CN); Yakun Wang, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/346,213

(22) PCT Filed: Nov. 26, 2018

(86) PCT No.: PCT/CN2018/117427
§ 371 (c)(1),
(2) Date: Apr. 30, 2019

(87) PCT Pub. No.: WO2019/169908
PCT Pub. Date: Sep. 12, 2019

(65) Prior Publication Data
US 2019/0278548 A1 Sep. 12, 2019

(30) Foreign Application Priority Data
Mar. 6, 2018 (CN) .......................... 2018 1 0182096

(51) Int. Cl.
*G06F 3/14* (2006.01)
*G06T 15/80* (2011.01)

(52) U.S. Cl.
CPC ............ *G06F 3/1415* (2013.01); *G06T 15/80* (2013.01)

(58) Field of Classification Search
CPC .............................. G06F 3/1415; G06T 15/80
(Continued)

(56) References Cited

U.S. PATENT DOCUMENTS

2002/0057279 A1* 5/2002 Jouppi ..................... G09G 5/00
345/619
2009/0225001 A1* 9/2009 Biocca .................... G06F 3/147
345/8

(Continued)

FOREIGN PATENT DOCUMENTS

CN       103018907 A    4/2013
CN       105915972 A    8/2016
(Continued)

OTHER PUBLICATIONS

First Office Action in the Chinese Patent Application No. 201810182096.6, dated Feb. 28, 2020; English translation attached.
(Continued)

*Primary Examiner* — Hai Tao Sun
(74) *Attorney, Agent, or Firm* — Intellectual Valley Law, P.C.

(57) ABSTRACT

An image processing method. The method includes determining a first mapping relationship between first coordinates in a first coordinate system of a Multi-Resolution-Shading image and second coordinates in a second coordinate system of a Multi-Resolution-Shading screen image; and applying an anti-distortion process to the Multi-Resolution-Shading image based on the first mapping relationship, thereby obtaining an anti-distortion image.

10 Claims, 7 Drawing Sheets

(58) Field of Classification Search
USPC .......................................................... 345/619
See application file for complete search history.

(56) References Cited

U.S. PATENT DOCUMENTS

| | | | | |
|---|---|---|---|---|
| 2011/0285960 | A1* | 11/2011 | Kohn | A61B 3/032 351/159.74 |
| 2017/0293146 | A1 | 10/2017 | Nicholls et al. | |
| 2018/0090052 | A1* | 3/2018 | Marsh | G09G 3/20 |
| 2019/0138089 | A1 | 5/2019 | Li et al. | |
| 2019/0236757 | A1 | 8/2019 | Wang | |
| 2019/0279427 | A1 | 9/2019 | Tang et al. | |

FOREIGN PATENT DOCUMENTS

| | | |
|---|---|---|
| CN | 106487893 A | 3/2017 |
| CN | 106572342 A | 4/2017 |
| CN | 106873162 A | 6/2017 |
| CN | 107153519 A | 9/2017 |
| CN | 107220925 A | 9/2017 |
| CN | 107248145 A | 10/2017 |
| CN | 107516335 A | 12/2017 |
| CN | 107742512 A | 2/2018 |

OTHER PUBLICATIONS

International Search Report & Written Opinion dated Feb. 25, 2019, regarding PCT/CN2018/117427.

* cited by examiner

Multi-Resolution-Shading image

IMAGE PROCESSING METHOD AND APPARATUS, VIRTUAL REALITY APPARATUS, AND COMPUTER-PROGRAM PRODUCT

CROSS-REFERENCE TO RELATED APPLICATION

This application is a national stage application under 35 U.S.C. § 371 of International Application No. PCT/CN2018/117427, filed Nov. 26, 2018, which claims priority to Chinese Patent Application No. 201810182096.6, filed Mar. 6, 2018, the contents of which are incorporated by reference in the entirety.

TECHNICAL FIELD

The present invention relates to display technology, more particularly, to an image processing method, an image processing apparatus, a virtual reality display apparatus, and a computer-program product.

BACKGROUND

The development of the virtual reality technology demands higher resolution and higher refresh rate in display apparatuses. As the resolution of a display apparatus becomes higher, the amount of data required to be transmitted from a computer terminal (e.g., a personal computer) to the display apparatus becomes greater. This in turn places a high demand on the bandwidth of the broadband.

SUMMARY

In one aspect, the present invention provides an image processing method, comprising determining a first mapping relationship between first coordinates in a first coordinate system of a Multi-Resolution-Shading image and second coordinates in a second coordinate system of a Multi-Resolution-Shading screen image; and applying an anti-distortion process to the Multi-Resolution-Shading image based on the first mapping relationship, thereby obtaining an anti-distortion image.

Optionally, the image processing method further comprises sending the anti-distortion image to a display apparatus; applying an image flattening process by the display apparatus to the anti-distortion image thereby obtaining a flattened anti-distortion image; and displaying the flattened anti-distortion image.

Optionally, determining the first mapping relationship comprise determining a second mapping relationship between third coordinates in a third coordinate system of an original image and fourth coordinates in a fourth coordinate system of a screen image; determining a third mapping relationship between the third coordinates of the third coordinate system of the original image and the first coordinates of the first coordinate system of the Multi-Resolution-Shading image; determining a fourth mapping relationship between the first coordinates of the first coordinate system of the Multi-Resolution-Shading image and the fourth coordinates of the fourth coordinate system of the screen image based on the second mapping relationship and the third mapping relationship; applying a Multi-Resolution-Shading Process to the fourth coordinates in the fourth coordinate system of the screen image based on the third mapping relationship, thereby obtaining the second coordinates in the second coordinate system of the Multi-Resolution-Shading screen image; and determining the first mapping relationship using based on the fourth mapping relationship and the second coordinates of the second coordinate system of the Multi-Resolution-Shading screen image.

Optionally, applying the Multi-Resolution-Shading Process to the fourth coordinates in the fourth coordinate system of the screen image comprises determining a gaze position in the screen image; separating the screen image into a high-resolution region and a plurality of low-resolution regions based on the gaze position in the screen image; and applying Multi-Resolution-Shading Process to the fourth coordinates in a fourth coordinate system of a plurality of regions of the screen image including the high-resolution region and the plurality of low-resolution regions in the screen image based on the third mapping relationship, thereby obtaining the second coordinates in the second coordinate system of the Multi-Resolution-Shading screen image.

Optionally, the third mapping relationship is expressed as $$\begin{cases} x' = \dfrac{x * \text{Width} + TopLeftX}{W_{mrs}} \\ y' = \dfrac{y * \text{Height} + TopLeftY}{H_{mrs}} \end{cases};$$

wherein x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a resolution of a region of the Multi-Resolution-Shading image having the pixel, Wmrs and Hmrs represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel.

Optionally, determining the gaze position in the screen image comprises determining the gaze position in the screen image is performed according to $$\begin{cases} o = s(o2 - o1) + t(o3 - o1) \\ o' = s(o2' - o1') + t(o3' - o1') \end{cases};$$

wherein, o is a gaze point of the Multi-Resolution-Shading image, o1, o2, o3 are respective three vertices of a triangular region of the Multi-Resolution-Shading image having o, o' is a gaze point of the screen image, o1', o2', o3' are respective three vertices of a triangular region of the screen image where o' locates, s and t are variable parameters.

In another aspect, the present invention provides an image processing apparatus, comprising a memory; and one or more processors; wherein the memory and the one or more processors are connected with each other; and the memory stores computer-executable instructions for controlling the one or more processors to determine a first mapping relationship between first coordinates in a first coordinate system of a Multi-Resolution-Shading image and second coordinates in a second coordinate system of a Multi-Resolution- Shading screen image; and apply an anti-distortion process to the Multi-Resolution-Shading image based on the first mapping relationship, thereby obtaining an anti-distortion image.

Optionally, the image processing apparatus further comprises a display apparatus; wherein the display apparatus is configured to apply an image flattening process to the anti-distortion image thereby obtaining a flattened anti-distortion image; and display the flattened anti-distortion image.

Optionally, the memory further stores computer-executable instructions for controlling the one or more processors to determine a second mapping relationship between third coordinates in a third coordinate system of an original image and fourth coordinates in a fourth coordinate system of a screen image; determine a third mapping relationship between the third coordinates of the third coordinate system of the original image and the first coordinates of the first coordinate system of the Multi-Resolution-Shading image; determine a fourth mapping relationship between the first coordinates of the first coordinate system of the Multi-Resolution-Shading image and the fourth coordinates of the fourth coordinate system of the screen image based on the second mapping relationship and the third mapping relationship; apply a Multi-Resolution-Shading Process to the fourth coordinates in the fourth coordinate system of the screen image based on the third mapping relationship, thereby obtaining the second coordinates in the second coordinate system of the Multi-Resolution-Shading screen image; and determine the first mapping relationship using based on the fourth mapping relationship and the second coordinates of the second coordinate system of the Multi-Resolution-Shading screen image.

Optionally, the memory further stores computer-executable instructions for controlling the one or more processors to determine a gaze position in the screen image; separate the screen image into a high-resolution region and a plurality of low-resolution regions based on the gaze position in the screen image; and apply Multi-Resolution-Shading Process to the fourth coordinates in a fourth coordinate system of a plurality of regions of the screen image including the high-resolution region and the plurality of low-resolution regions in the screen image based on the third mapping relationship, thereby obtaining the second coordinates in the second coordinate system of the Multi-Resolution-Shading screen image.

Optionally, the third mapping relationship is expressed as $$\begin{cases} x' = \dfrac{x * \text{Width} + TopLeftX}{W_{mrs}} \\ y' = \dfrac{y * \text{Height} + TopLeftY}{H_{mrs}} \end{cases};$$

wherein x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a resolution of a region of the Multi-Resolution-Shading image having the pixel, Wmrs and Hmrs represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel.

Optionally, the memory further stores computer-executable instructions for controlling the one or more processors to determine the gaze position in the screen image is performed according to $$\begin{cases} o = s(o2 - o1) + t(o3 - o1) \\ o' = s(o2' - o1') + t(o3' - o1') \end{cases};$$

wherein, o is a gaze point of the Multi-Resolution-Shading image, o1、o2、o3 are respective three vertices of a triangular region of the Multi-Resolution-Shading image having o, o' is a gaze point of the screen image, o1'、o2'、o3' are respective three vertices of a triangular region of the screen image where o' locates, s and t are variable parameters.

In another aspect, the present invention provides a virtual reality display apparatus, comprising the image processing apparatus described herein.

In another aspect, the present invention provides a computer-program product comprising a non-transitory tangible computer-readable medium having computer-readable instructions thereon, the computer-readable instructions being executable by a processor to cause the processor to perform determining a first mapping relationship between first coordinates in a first coordinate system of a Multi-Resolution-Shading image and second coordinates in a second coordinate system of a Multi-Resolution-Shading screen image; applying an anti-distortion process to the Multi-Resolution-Shading image based on the first mapping relationship, thereby obtaining an anti-distortion image; and sending the anti-distortion image to a display apparatus.

Optionally, the computer-readable instructions are executable by a processor to cause the processor to further perform determining a second mapping relationship between third coordinates in a third coordinate system of an original image and fourth coordinates in a fourth coordinate system of a screen image; determining a third mapping relationship between the third coordinates of the third coordinate system of the original image and the first coordinates of the first coordinate system of the Multi-Resolution-Shading image; determining a fourth mapping relationship between the first coordinates of the first coordinate system of the Multi-Resolution-Shading image and the fourth coordinates of the fourth coordinate system of the screen image based on the second mapping relationship and the third mapping relationship; applying a Multi-Resolution-Shading Process to the fourth coordinates in the fourth coordinate system of the screen image based on the third mapping relationship, thereby obtaining the second coordinates in the second coordinate system of the Multi-Resolution-Shading screen image; and determining the first mapping relationship using based on the fourth mapping relationship and the second coordinates of the second coordinate system of the Multi-Resolution-Shading screen image.

Optionally, the computer-readable instructions are executable by a processor to cause the processor to further perform determining a gaze position in the screen image; separating the screen image into a high-resolution region and a plurality of low-resolution regions based on the gaze position in the screen image; and applying Multi-Resolution-Shading Process to the fourth coordinates in a fourth coordinate system of a plurality of regions of the screen image including the high-resolution region and the plurality of low-resolution regions in the screen image based on the third mapping relationship, thereby obtaining the second coordinates in the second coordinate system of the Multi-Resolution-Shading screen image.

Optionally, the third mapping relationship is expressed as $$\begin{cases} x' = \dfrac{x * \text{Width} + TopLeftX}{W_{mrs}} \\ y' = \dfrac{y * \text{Height} + TopLeftY}{H_{mrs}} \end{cases};$$

wherein x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a resolution of a region of the Multi-Resolution-Shading image having the pixel, $W_{mrs}$ and $H_{mrs}$ represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel.

Optionally, the computer-readable instructions are executable by a processor to cause the processor to determine the gaze position in the screen image is performed according to $$\begin{cases} o = s(o2 - o1) + t(o3 - o1) \\ o' = s(o2' - o1') + t(o3' - o1') \end{cases};$$

wherein o is a gaze point of the Multi-Resolution-Shading image, o1、o2、o3 are respective three vertices of a triangular region of the Multi-Resolution-Shading image having o, o' is a gaze point of the screen image, o1'、o2'、o3' are respective three vertices of a triangular region of the screen image where o' locates, s and t are variable parameters.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an image processing method, an image processing apparatus, a virtual reality display apparatus, and a computer-program product that substantially obviate one or more of the problems due to limitations and disadvantages of the related art. In one aspect, the present disclosure provides an image processing method. In some embodiments, the image processing method includes determining a first mapping relationship between rust coordinates in a first coordinate system of a Multi-Resolution-Shading image and second coordinates in a second coordinate system of a Multi-Resolution-Shading screen image; and applying an anti-distortion process to the Multi-Resolution-Shading image based on the first mapping relationship, thereby obtaining an anti-distortion image.

Figure 1:
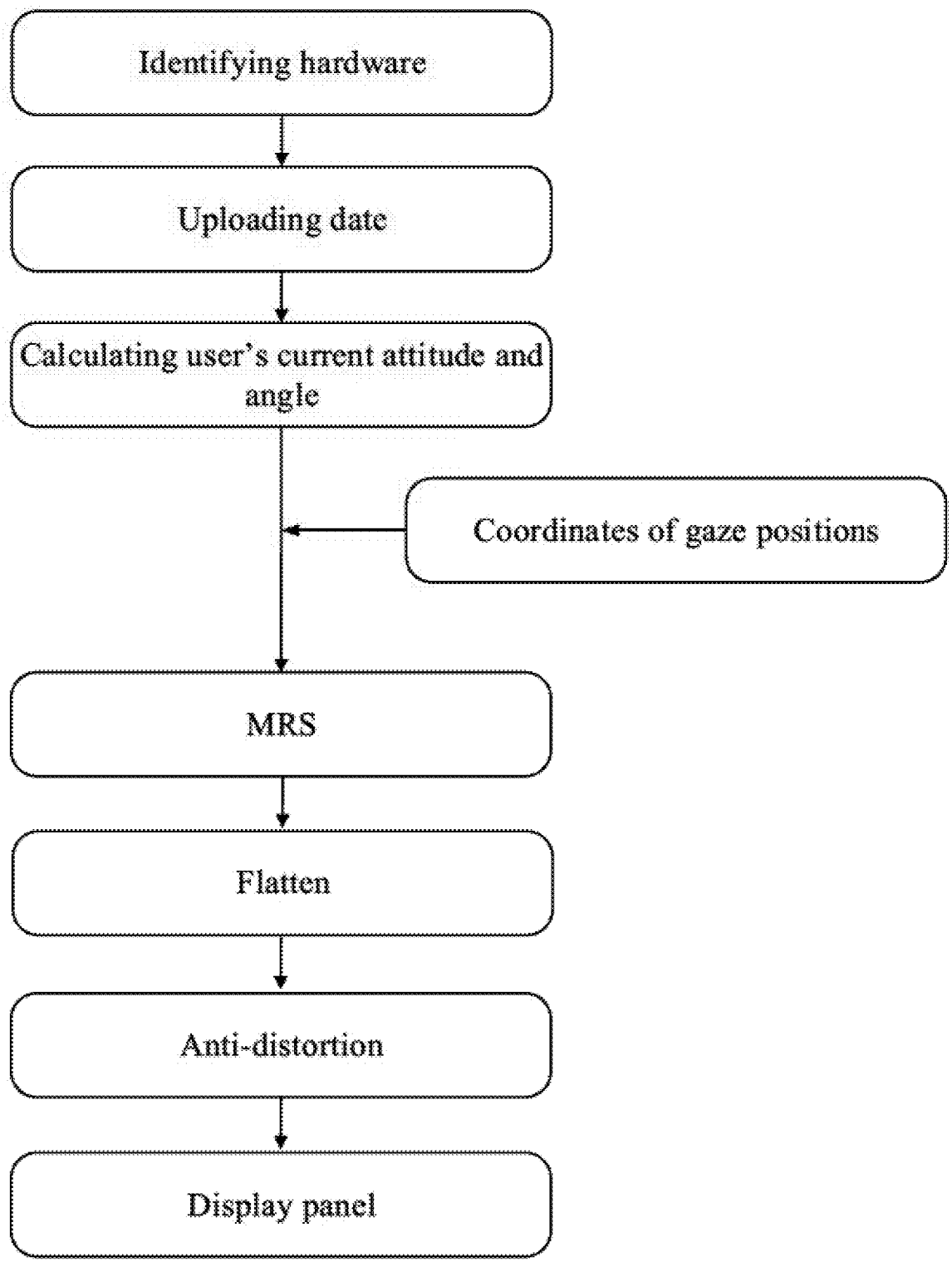
FIG. 1 is a flow chat illustrating an image processing method in some embodiments according to the present disclosure.

FIG. 1 is a flow chat illustrating an image processing method in some embodiments according to the present disclosure. Referring to FIG. 1, the process of image processing in a virtual reality system includes identifying the hardware using a computer terminal (e.g., a processor), uploading the data of gyroscope, calculating user's current posture, applying a Multi-Resolution-Shading process to an original image based on coordinates of a gaze position, thereby obtaining a Multi-Resolution-Shading image. In one example, the target monocular resolution is 4K*4K, a Multi-Resolution-Shading process is applied to an original image, thereby obtaining a Multi-Resolution-Shading image. The monocular resolution of the Multi-Resolution-Shading image is 2K*2K. A flattening process is then applied to the Multi-Resolution-Shading image, thereby obtaining a flattened image. The monocular resolution of the flattened image is 4K*4K. An anti-distortion process is then applied to the flattened image, thereby obtaining an anti-distortion image which will be sent to the display apparatus. According to the above process, as the resolution of the image displayed by the display apparatus becomes higher, the amount of data sent from the computer terminal to the display apparatus becomes larger.

Figure 2:
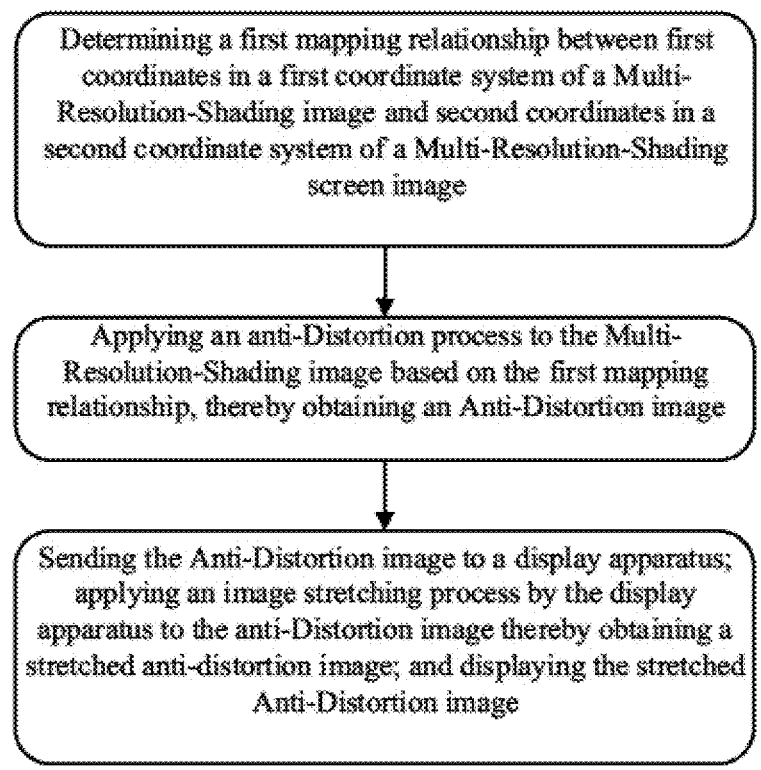
FIG. 2 is a flow chat illustrating an image processing method based on virtual reality in some embodiments according to the present disclosure.

FIG. 2 is a flow chat illustrating an image processing method based on virtual reality in some embodiments according to the present disclosure. Referring to FIG. 2, the image processing method includes determining a first mapping relationship between first coordinates in a first coordinate system of a Multi-Resolution-Shading image and second coordinates in a second coordinate system of a Multi-Resolution-Shading screen image. In some embodiments, determining the first mapping relationship includes determining a second mapping relationship between third coordinates in a third coordinate system of an original image and fourth coordinates in a fourth coordinate system of a screen image; determining a third mapping relationship between the third coordinates of the third coordinate system of the original image and the first coordinates of the first coordinate system of the Multi-Resolution-Shading image; and determining a fourth mapping relationship between the first coordinates of the first coordinate system of the Multi-Resolution-Shading image and the fourth coordinates of the fourth coordinate system of the screen image based on the second mapping relationship and the third mapping relationship. Optionally, the method further includes applying a Multi-Resolution-Shading Process to the fourth coordinates in the fourth coordinate system of the screen image based on the third mapping relationship, thereby obtaining the second coordinates in the second coordinate system of the Multi-Resolution-Shading screen image; determining the first mapping relationship using based on the fourth mapping relationship and the second coordinates of the second coordinate system of the Multi-Resolution-Shading screen image.

Figure 3:
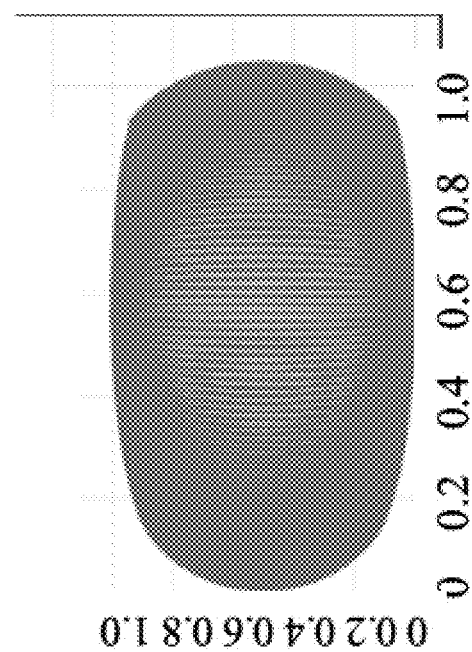
FIG. 3 is a flow chat illustrating a second mapping relationship between third coordinates in a third coordinate system of an original image and fourth coordinates in a fourth coordinate system of a screen image in some embodiments according to the present disclosure.
Figure 3:
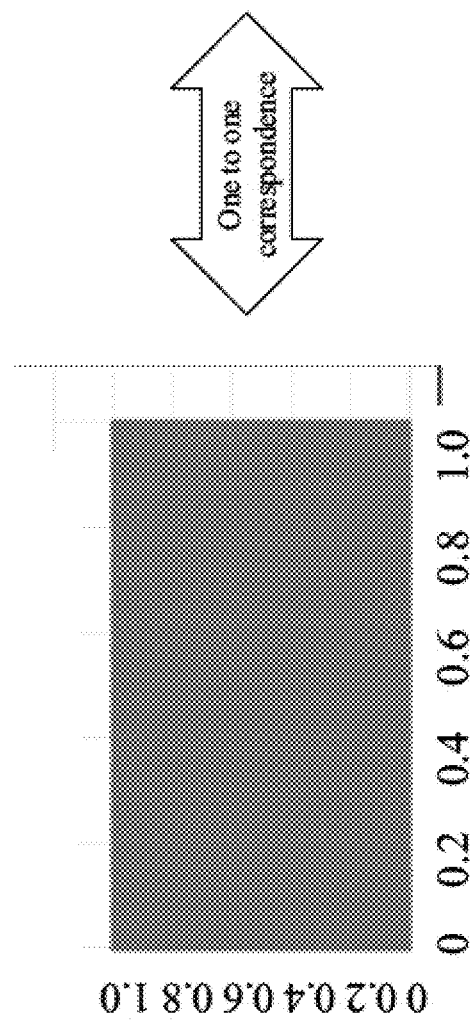

FIG. 3 is a flow chat illustrating a second mapping relationship between third coordinates in the third coordinate system of the original image and fourth coordinates in the fourth coordinate system of the screen image in some embodiments according to the present disclosure. Referring to FIG. 3, the third coordinates in the third coordinate system of the original image is corresponding to the fourth coordinates in the fourth coordinate system of the screen image. The lower left corners of both the third coordinate system of the original image and the fourth coordinate system of the screen image are defined as (0, 0). The coordinates in both the third coordinate system of the original image and the fourth coordinate system of the screen image are normalized coordinates (e.g. if the coordinate of a point of the fourth coordinates in a fourth coordinate system of a screen image exceeds 1, a respective point in the original image will not be shown on the display panel.) Using bilinear interpolation, each pixel of the screen image is corresponding to a respective pixel of the original image. When an anti-distortion process is applied, each pixel of the screen image shows a greyscale respectively corresponding to the greyscale of the pixel of the original image, thereby performing the anti-distortion proms.

Figure 4:
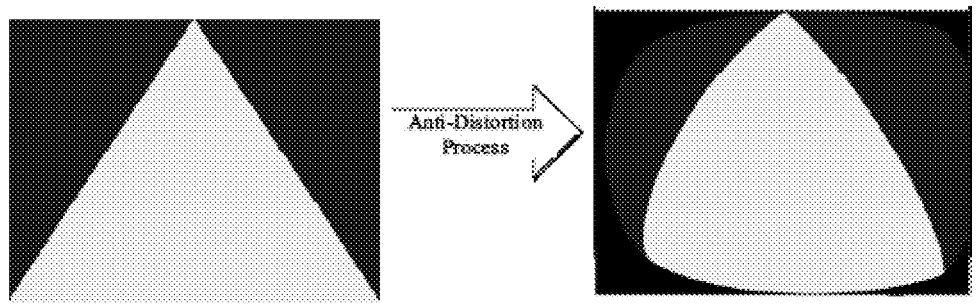
FIG. 4 is a flow chat illustrating an anti-distortion process based on the second mapping relationship in some embodiments according to the present disclosure.

FIG. 4 is a flow chat illustrating an anti-distortion process based on the second mapping relationship in some embodiments according to the present disclosure. Referring to FIG. 4, the left figure in FIG. 4 is the original image, and the right figure in FIG. 4 is the anti-distortion image (e.g., the screen image) obtained by applying the anti-distortion process to the original image based on the second mapping relationship.

Figure 5:
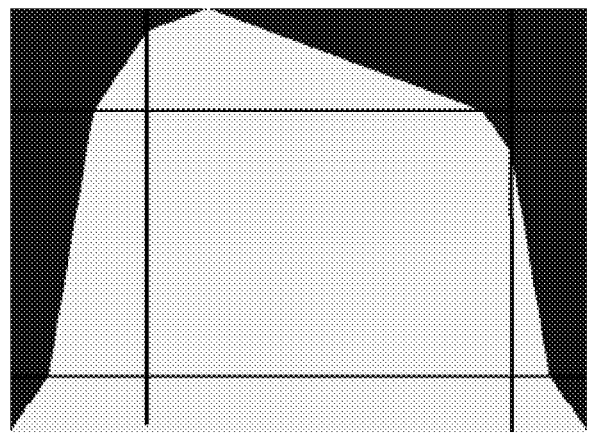
FIG. 5 is a Multi-Resolution-Shading image obtained by applying Multi-Resolution-Shading process to the original image in some embodiments according to the present disclosure.

FIG. 5 is a Multi-Resolution-Shading image obtained by applying Multi-Resolution-Shading process to the original image in some embodiments according to the present disclosure. Referring to FIG. 5, the black lines in FIG. 5 are lines separating multiple regions in Multi-Resolution-Shading image. In some embodiments, the gaze position is in the center of the Multi-Resolution-Shading image. Optionally, the Multi-Resolution-Shading image can be separated into 9 regions (3×3, or any other appropriate formats. In some embodiment, the Multi-Resolution-Shading image is separated into a high-resolution region and a plurality of low-resolution regions. The high-resolution region of the Multi-Resolution-Shading image is the central region. The plurality of low-resolution regions of the Multi-Resolution-Shading image are the peripheral regions. In some embodiments, the gaze position is in the center of the high-resolution region of the original image, therefore, the high-resolution region of the original image is determined based the gaze position. Optionally, the high-resolution region of the original image is a square region. Optionally, based on the four vertices of the high-resolution region of the original image, the other eight low-resolution regions of the original image are determined respectively a top region, a bottom region, a left region, a right region, a top left region, a bottom left region, a top right region, and a bottom right region, respectively with respect to the high-resolution region of the original image.

Based on the principle of Multi-Resolution-Shading process on the Geometric shape of the original image, the correspondence relationship between p'(x', y') of the first coordinates in the first coordinate system of the Multi-Resolution-Shading image and the p(x, y) of the third coordinates in the third coordinate system of the original image is obtained. The third mapping relationship between the first coordinates in the first coordinate system of the Multi-Resolution-Shading image and the third coordinates in the third coordinate system of the original image is obtained.

In some embodiments, the third mapping relationship can be expressed according to Equation (1):

$$\begin{cases} x' = \dfrac{x*\text{Width} + TopLeftX}{W_{mrs}} \\ y' = \dfrac{y*\text{Height} + TopLeftY}{H_{mrs}} \end{cases} \quad (1)$$

Wherein, x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a size of a region of the Multi-Resolution-Shading image having the pixel (which represented by resolution), $W_{mrs}$ and $H_{mrs}$ represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel.

Figure 6:
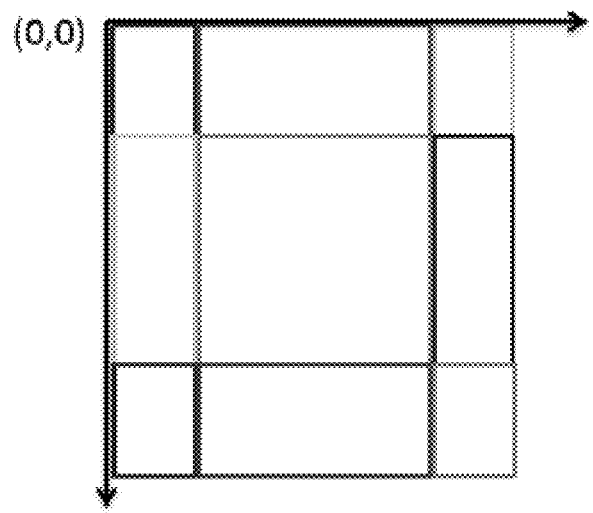
FIG. 6 is a schematic diagram of a coordinate of Multi-Resolution-Shading image in some embodiments according to the present disclosure.

FIG. 6 is a schematic diagram of a coordinate of Multi-Resolution-Shading image in some embodiments according to the present disclosure. The first coordinate system of a Multi-Resolution-Shading image is defined as the coordinate system shown in FIG. 6.

Figures 7, 8, 9:
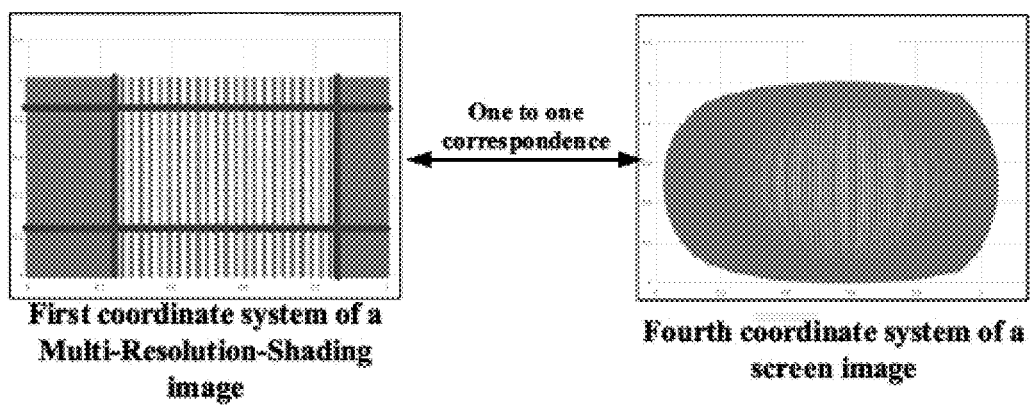
FIG. 7 illustrates a fourth mapping relationship between first coordinates in a first coordinate system of a Multi-Resolution-Shading image and Fourth coordinates in a fourth coordinate system of a screen image in some embodiments according to the present disclosure.
FIG. 8 illustrates an anti-distortion process based on the fourth mapping relationship in some embodiments according to the present disclosure.
FIG. 9 is a schematic diagram illustrating bilinear interpolation in some embodiments according to the present disclosure.

FIG. 7 illustrates a fourth mapping relationship between first coordinates in a first coordinate system of a Multi-Resolution-Shading image and Fourth coordinates in a fourth coordinate system of a screen image in some embodiments according to the present disclosure. Referring to FIG. 7, based on the second mapping relationship and the third mapping relationship, the fourth mapping relationship between the first coordinates in the first coordinate system of the Multi-Resolution-Shading image and the fourth coordinates in the fourth coordinate system of the screen image is obtained.

FIG. 8 illustrates an anti-distortion process based on the fourth mapping relationship in some embodiments according to the present disclosure. Referring to FIG. 8, under the fourth mapping relationship, if the Multi-Resolution-Shading image (left figure in FIG. 8) is inputted, an anti-distortion image (right figure in FIG. 8) will be outputted, i.e. the screen image is outputted.

In some embodiments, the Multi-Resolution-Shading Process (according to the third mapping relationship) is applied to the fourth coordinates in a fourth coordinate system of a plurality of regions of the screen image including the high-resolution region of the screen image and the plurality of low-resolution regions of the screen image based on the third mapping relationship, thereby obtaining the second coordinates in the second coordinate system of the Multi-Resolution-Shading screen image. The Multi-Resolution-Shading image is defined under a coordinate system of image, the anti-distortion image is defined under a coordinate system of screen image. Thus, the center of the high-resolution region of the Multi-Resolution-Shading image is a point on an image plane (a point in the coordinate system of image), but the respective center of the screen image is on an object plane (a point in the coordinate system of screen image). In order to perform Multi-Resolution-Shading process on the screen image (an anti-distortion image), it is necessary to calculate the gaze position in the screen image. For example, it is necessary to determine a position in the object plan corresponding to the central point of the high-resolution region (the gaze point) on the image plane. Thus, the gaze position in the screen image can be derive from the gaze position (the central point of the high-resolution region) in the Multi-Resolution-Shading image.

FIG. 9 is a schematic diagram illustrating bilinear interpolation in some embodiments according to the present disclosure. Referring to FIG. 9, the gaze position in the screen image is determined using Equation (2):

$$\begin{cases} o = s(o2 - o1) + t(o3 - o1) \\ o' = s(o2' - o1') + t(o3' - o1') \end{cases} \quad (2)$$

wherein o is a gaze point of the Multi-Resolution-Shading image, o1、o2、o3 are respective three vertices of a triangular region of the Multi-Resolution-Shading image having o, o' is a gaze point of the screen image, o1'、o2'、o3' are respective three vertices of a triangular region of the screen image where o' locates, s and t are variable parameters.

After calculating the first coordinate of the respective center of high-resolution region of the Multi-Resolution-Shading image corresponding to the fourth coordinate of the center of the high-resolution region of the screen image, the Multi-Resolution-Shading process is applied to the fourth coordinates in the fourth coordinate system of the screen image (i.e. the Multi-Resolution-Shading process is performed using Equation (1)), and the second coordinates in the second coordinate system of the Multi-Resolution-Shading screen image is obtained.

Figure 10:
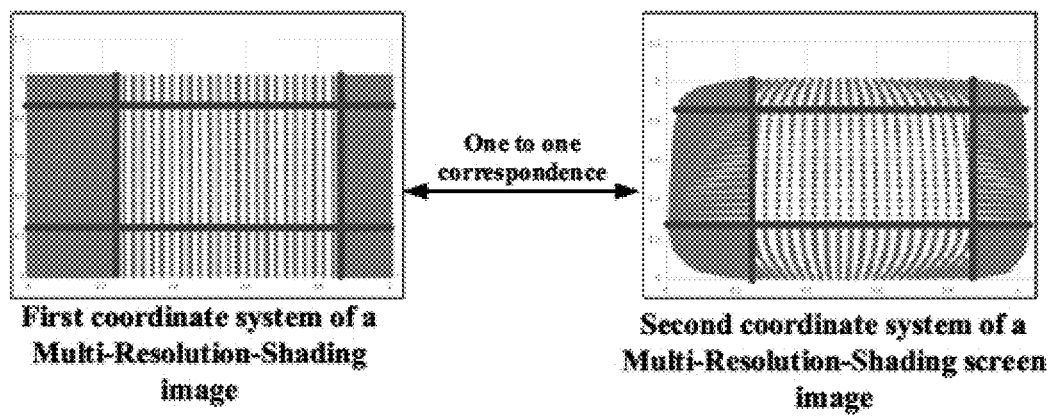
FIG. 10 is a flow chat illustrating a first mapping relationship between first coordinates in a first coordinate system of a Multi-Resolution-Shading image and second coordinates in a second coordinate system of a Multi-Resolution-Shading screen image in some embodiments according to the present disclosure.

Therefore, the first mapping relationship is obtained by using the fourth mapping relationship and the second coordinates in the second coordinate system of the Multi-Resolution-Shading screen image FIG. 10 is a flow chat illustrating a first mapping relationship between first coordinates in a first coordinate system of a Multi-Resolution-Shading image and second coordinates in a second coordinate system of a Multi-Resolution-Shading screen image in some embodiments according to the present disclosure.

Referring to FIG. 2, in some embodiments, the image processing method includes applying an anti-distortion process to the Multi-Resolution-Shading image based on the first mapping relationship, thereby obtaining an anti-distortion image.

Figure 11:
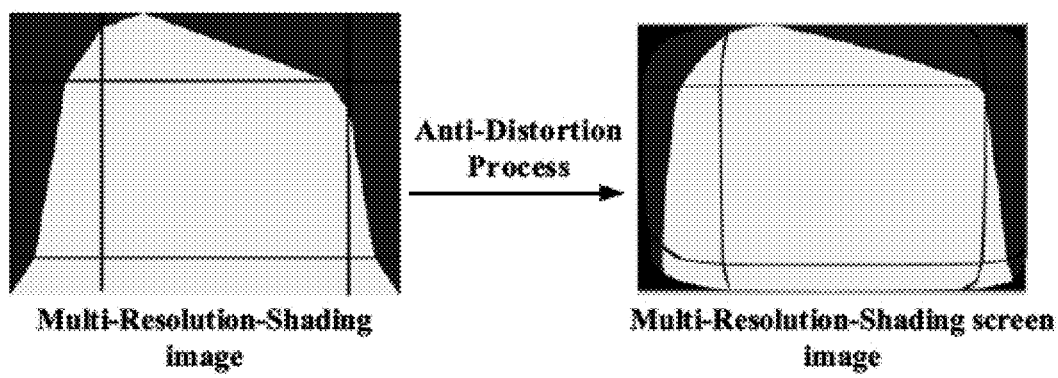
FIG. 11 is a flow chat illustrating an anti-distortion process based on the first mapping relationship in some embodiments according to the present disclosure.

FIG. 11 is a flow chat illustrating an anti-distortion process based on the first mapping relationship in some embodiments according to the present disclosure. Referring to FIG. 11, after determining the first mapping relationship, whatever Multi-Resolution-Shading image is inputted, the respective anti-distortion image is outputted based on the first mapping relationship.

Figure 12:
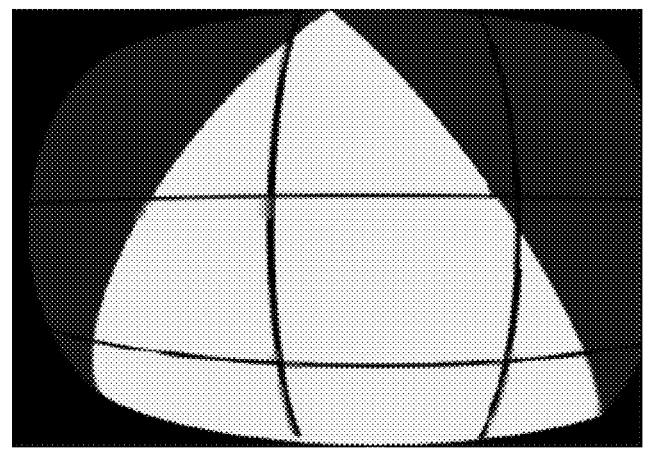
FIG. 12 is a schematic diagram of a flattened anti-distortion image displayed by a display apparatus in some embodiments according to the present disclosure.

FIG. 12 is a schematic diagram of a flattened anti-distortion image displayed by a display apparatus in some embodiments according to the present disclosure. Referring to FIG. 2 and FIG. 12, in some embodiments, the image processing method includes sending the anti-distortion image to a display apparatus, and applying an image flattening process by the display apparatus to the anti-distortion image thereby obtaining a flattened anti-distortion image, and displaying the flattened anti-distortion image. In some embodiments, during the image flattening process, each line of the pixels in the anti-distortion image is flattened into N lines, which are subsequently displayed. By having this design, the amount of computation required for the display apparatus can be lowered, reducing power consummation of the display apparatus.

In the present image processing method, a first mapping relationship between first coordinates in a first coordinate system of a Multi-Resolution-Shading image and second coordinates in a second coordinate system of a Multi-Resolution-Shading screen image is determined; an anti-distortion process to the Multi-Resolution-Shading image based on the first mapping relationship is applied to obtain an anti-distortion image. The anti-distortion image is sent to a display apparatus. The display apparatus applies an image flattening process to the anti-distortion image to obtain a flattened anti-distortion image; and displays the flattened anti-distortion image. In the present disclosure, the computer terminal (e.g., a processor) only applies anti-distortion process on the Multi-Resolution-Shading image without applying any flattening process. The flattening process is only applied by the display apparatus. By having this design, at least one step of rendering performed by the computer terminal can be reduced. The present method can reduce the time lag in the image processing, and reduce the amount of data transmitted from the computer terminal to display apparatus.

Figure 13:
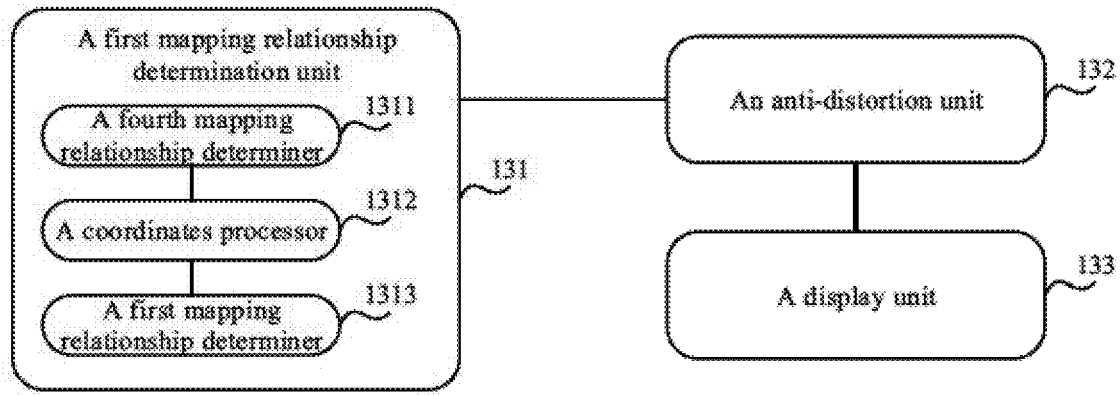
FIG. 13 is a schematic diagram illustrating the structure of an image processing apparatus based on virtual reality in some embodiments according to the present disclosure.

FIG. 13 is a schematic diagram illustrating the structure of an image processing apparatus based on virtual reality in some embodiments according to the present disclosure. Referring to FIG. 13, the present disclosure provides an image processing apparatus including: a first mapping relationship determination unit 131 configured to determine a first mapping relationship between first coordinates in a first coordinate system of a Multi-Resolution-Shading image and second coordinates in a second coordinate system of a Multi-Resolution-Shading screen image; an anti-distortion processing unit 132 configured to apply an anti-distortion process to the Multi-Resolution-Shading image based on the first mapping relationship thereby obtaining an anti-distortion image; a display unit 133 configured to send the anti-distortion image to a display apparatus. The display apparatus is configured to apply an image flattening process to the anti-distortion image thereby obtaining a flattened anti-distortion image; and display the flattened anti-distortion image.

In some embodiment, the first mapping relationship determination unit 131 includes a fourth mapping relation determiner 1311, a coordinates processor 1312, and a first mapping relationship determiner 1313. The fourth mapping relation determiner 1311 is configured to determine a second mapping relationship between third coordinates in a third coordinate system of an original image and fourth coordinates in a fourth coordinate system of a screen image, determine a third mapping relationship between the third coordinates of the third coordinate system of the original image and the first coordinates of the first coordinate system of the Multi-Resolution-Shading image, and determine a fourth mapping relationship between the first coordinates of the first coordinate system of the Multi-Resolution-Shading image and the fourth coordinates of the fourth coordinate system of the screen image based on the second mapping relationship and the third mapping relationship. The coordinates processor 1312 is configured to apply a Multi-Resolution-Shading Process to the fourth coordinates in the fourth coordinate system of the screen image based on the third mapping relationship, thereby obtaining the second coordinates in the second coordinate system of the Multi-Resolution-Shading screen image. The first mapping relationship determiner 1313 is configured to determine the first mapping relationship based on the fourth mapping relationship and the second coordinates of the second coordinate system of the Multi-Resolution-Shoring screen image.

In some embodiments, the coordinates processor 1312 is configured to determine a gaze position in the screen image, separate the screen image into a high-resolution region and a plurality of low-resolution regions based on the gaze position in the screen image, and apply a Multi-Resolution-Shading Process to the fourth coordinates in a fourth coordinate system of a plurality of regions of the screen image including the high-resolution region and the plurality of low-resolution regions in the screen image based on the second mapping relationship, thereby obtaining the second coordinates in the second coordinate system of the Multi-Resolution-Shading screen image. Optionally, the third mapping relationship is expressed as $$\begin{cases} x' = \dfrac{x * \text{Width} + TopLeftX}{W_{mrs}} \\ y' = \dfrac{y * \text{Height} + TopLeftY}{H_{mrs}} \end{cases},$$

wherein x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a resolution of a region of the Multi-Resolution-Shading image having the pixel, Wmrs and Hmrs represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel. Optionally, the coordinates processor 1312 is configured to determine a gaze position in the screen image according to $$\begin{cases} o = s(o2 - o1) + t(o3 - o1) \\ o' = s(o2' - o1') + t(o3' - o1') \end{cases},$$

wherein, o is a gaze point of the Multi-Resolution-Shading image, o1、o2、o3 are respective three vertices of a triangular region of the Multi-Resolution-Shading image having o, o' is a gaze point of the screen image, o1'、o2'、o3' are respective three vertices of a triangular region of the screen image where o' locates, s and t are variable parameters.

Figure 14:
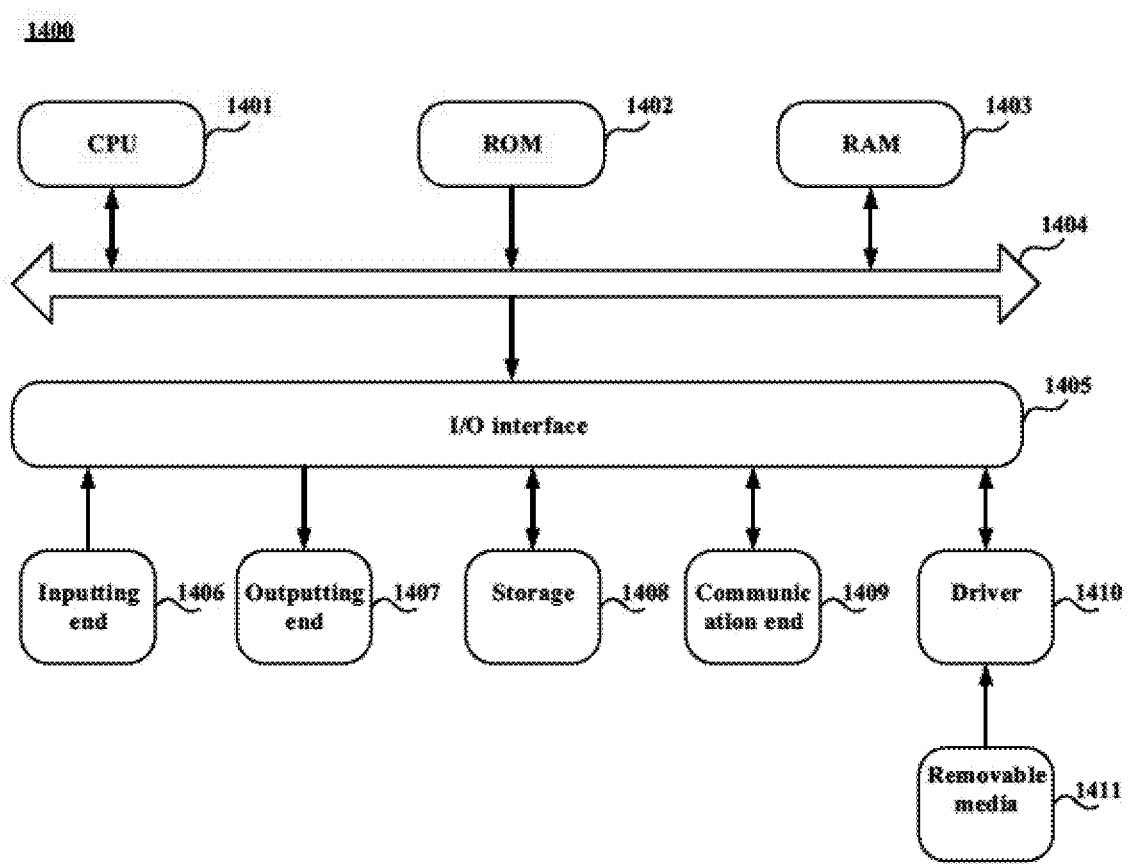
FIG. 14 is a schematic diagram illustrating the structure of a computer apparatus in some embodiments according to the present disclosure.

FIG. 14 is a schematic diagram illustrating the structure of a computer apparatus in some embodiments according to the present disclosure. Referring to FIG. 14, the present disclosure discloses the structure of a computer apparatus 1400. The computer apparatus 1400 includes a Central Processing Unit (CPU) 1401 configured to perform under the software stored in a Read-only Memory (ROM) 1402. Optionally, the CPU 1401 is configured to perform under the software randomly downloaded from a storage 1408 to a Random-access Memory (RAM) 1403. In some embodiments, all necessary software and data used by the computer apparatus 1400 are stored in the RAM 1403. In some embodiments, CPU 1401, ROM 1402 and RAM 1403 are connected to each other through line 1404. In some embodiments, a I/O interface 1405 is connected to the line 1404. In some embodiments, the elements connected to the I/O interface 1405 includes an inputting end 1406 (e.g. keyboards, mice and so on), and an outputting end 1407 (e.g. cathode ray tubes CRT, liquid crystal displays LCD, speakers and so on), and a storage 1408 (e.g. hard disks and so on), and a communication end 1409 for network interface cards (e.g. LAN cards, modems). Optionally, the communication end 1409 perform communication process via network such as internet. Optionally, a driver 1410 is connected to the I/O interface 1405. Optionally, a removable media 1411, such as magnetic disks, optical disks, magneto-optical disks, semi-conductor memory and so on, is installed on the driver 1410, which is convenient for the software to be read by the removable media to be installed in the storage 1408.

In some embodiments, the image processing apparatus includes a memory; and one or more processors. The memory and the one or more processors are connected with each other. In some embodiments, the memory stores computer-executable instructions for controlling the one or more processors to determine a first mapping relationship between first coordinates in a first coordinate system of a Multi-Resolution-Shading image and second coordinates in a second coordinate system of a Multi-Resolution-Shading screen image; and apply an anti-distortion process to the Multi-Resolution-Shading image based on the first mapping relationship, thereby obtaining an anti-distortion image.

In some embodiments, the image processing apparatus further includes a display apparatus. The display apparatus is configured to apply an image flattening process to the anti-distortion image thereby obtaining a flattened anti-distortion image; and display the flattened anti-distortion image.

In some embodiments, the memory further stores computer-executable instructions for controlling the one or more processors to determine a second mapping relationship between third coordinates in a third coordinate system of an original image and fourth coordinates in a fourth coordinate system of a screen image; determine a third mapping relationship between the third coordinates of the third coordinate system of the original image and the first coordinates of the first coordinate system of the Multi-Resolution-Shading image; determine a fourth mapping relationship between the first coordinates of the first coordinate system of the Multi-Resolution-Shading image and the fourth coordinates of the fourth coordinate system of the screen image based on the second mapping relationship and the third mapping relationship; apply a Multi-Resolution-Shading Process to the fourth coordinates in the fourth coordinate system of the screen image based on the third mapping relationship, thereby obtaining the second coordinates in the second coordinate system of the Multi-Resolution-Shading screen image; and determine the first mapping relationship using based on the fourth mapping relationship and the second coordinates of the second coordinate system of the Multi-Resolution-Shading screen image.

In some embodiments, the memory further stores computer-executable instructions for controlling the one or more processors to determine a gaze position in the screen image; separate the screen image into a high-resolution region and a plurality of low-resolution regions based on the gaze position in the screen image; and apply Multi-Resolution-Shading Process to the fourth coordinates in a fourth coordinate system of a plurality of regions of the screen image including the high-resolution region and the plurality of low-resolution regions in the maven image based on the third mapping relationship, thereby obtaining the second coordinates in the second coordinate system of the Multi-Resolution-Shading screen image.

In some embodiments, the third mapping relationship is expressed as $$\begin{cases} x' = \dfrac{x * \text{Width} + TopLeftX}{W_{mrs}} \\ y' = \dfrac{y * \text{Height} + TopLeftY}{H_{mrs}} \end{cases};$$

wherein x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a resolution of a region of the Multi-Resolution-Shading image having the pixel, Wmrs and Hmrs represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel.

In some embodiments, the memory further stores computer-executable instructions for controlling the one or more processors to determine the gaze position in the screen image is performed according to $$\begin{cases} o = s(o2 - o1) + t(o3 - o1) \\ o' = s(o2' - o1') + t(o3' - o1') \end{cases};$$

wherein, o is a gaze point of the Multi-Resolution-Shading image, o1、o2、o3 are respective three vertices of a triangular region of the Multi-Resolution-Shading image having o, o' is a gaze point of the screen image, o1'、o2'、o3' are respective three vertices of a triangular region of the screen image where o' locates, s and t are variable parameters In another aspect, the present disclosure provides a virtual reality display apparatus having the image processing apparatus described herein.

In another aspect, the present disclosure provides a computer-program product including a non-transitory tangible computer-readable medium having computer-readable instructions thereon. In some embodiments, the computer-readable instructions are executable by a processor to cause the processor to perform determining a first mapping relationship between first coordinates in a first coordinate system of a Multi-Resolution-Shading image and second coordinates in a second coordinate system of a Multi-Resolution-Shading screen image; applying an anti-distortion process to the Multi-Resolution-Shading image based on the first mapping relationship, thereby obtaining an anti-distortion image; and sending the anti-distortion image to a display apparatus.

In some embodiments, the computer-readable instructions are executable by a processor to cause the processor to further perform determining a second mapping relationship between third coordinates in a third coordinate system of an original image and fourth coordinates in a fourth coordinate system of a screen image; determining a third mapping relationship between the third coordinates of the third coordinate system of the original image and the first coordinates of the first coordinate system of the Multi-Resolution-Shading image; determining a fourth mapping relationship between the first coordinates of the first coordinate system of the Multi-Resolution-Shading image and the fourth coordinates of the fourth coordinate system of the screen image based on the second mapping relationship and the third mapping relationship; applying a Multi-Resolution-Shading Process to the fourth coordinates in the fourth coordinate system of the screen image based on the third mapping relationship, thereby obtaining the second coordinates in the second coordinate system of the Multi-Resolution-Shading screen image; and determining the first mapping relationship using based on the fourth mapping relationship and the second coordinates of the second coordinate system of the Multi-Resolution-Shading screen image.

In some embodiments, the computer-readable instructions are executable by a processor to cause the processor to further perform determining a gaze position in the screen image; separating the screen image into a high-resolution region and a plurality of low-resolution regions based on the gaze position in the screen image; and applying Multi-Resolution-Shading Process to the fourth coordinates in a fourth coordinate system of a plurality of regions of the screen image including the high-resolution region and the plurality of low-resolution regions in the screen image based on the third mapping relationship, thereby obtaining the second coordinates in the second coordinate system of the Multi-Resolution-Shading screen image.

In some embodiments, the third mapping relationship is expressed as $$\begin{cases} x' = \dfrac{x * \text{Width} + TopLeftX}{W_{mrs}} \\ y' = \dfrac{y * \text{Height} + TopLeftY}{H_{mrs}} \end{cases};$$

wherein x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a resolution of a region of the Multi-Resolution-Shading image having the pixel, Wmrs and Hmrs represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel.

In some embodiments, the computer-readable instructions are executable by a processor to cause the processor to determine the gaze position in the screen image is performed according to $$\begin{cases} o = s(o2 - o1) + t(o3 - o1) \\ o' = s(o2' - o1') + t(o3' - o1') \end{cases};$$

wherein, o is a gaze point of the Multi-Resolution-Shading image, o1、o2、o3 are respective three vertices of a triangular region of the Multi-Resolution-Shading image having o, o' is a gaze point of the screen image, o1'、o2'、o3' are respective three vertices of a triangular region of the screen image where o' locates, s and t are variable parameters.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image processing method, comprising:
   determining a first mapping relationship between first coordinates in a first coordinate system of a Multi-Resolution-Shading image and second coordinates in a second coordinate system of a Multi-Resolution-Shading screen image;
   applying an anti-distortion process to the Multi-Resolution-Shading image based on the first mapping relationship, thereby obtaining an anti-distortion image;
   sending the anti-distortion image to a display apparatus;
   applying an image flattening process by the display apparatus to the anti-distortion image thereby obtaining a flattened anti-distortion image; and
   displaying the flattened anti-distortion image;
   wherein determining the first mapping relationship comprises:
   determining a second mapping relationship between third coordinates in a third coordinate system of an original image and fourth coordinates in a fourth coordinate system of a screen image;
   determining a third mapping relationship between the third coordinates of the third coordinate system of the original image and the first coordinates of the first coordinate system of the Multi-Resolution-Shading image;
   determining a fourth mapping relationship between the first coordinates of the first coordinate system of the Multi-Resolution-Shading image and the fourth coordinates of the fourth coordinate system of the screen image based on the second mapping relationship and the third mapping relationship;
   applying a Multi-Resolution-Shading Process to the fourth coordinates in the fourth coordinate system of the screen image based on the third mapping relationship, thereby obtaining the second coordinates in the second coordinate system of the Multi-Resolution-Shading screen image; and
   determining the first mapping relationship using based on the fourth mapping relationship and the second coordinates of the second coordinate system of the Multi-Resolution-Shading screen image;

wherein applying the Multi-Resolution-Shading Process to the fourth coordinates in the fourth coordinate system of the screen image comprises:

determining a gaze position in the screen image;

separating the screen image into a high-resolution region and a plurality of low-resolution regions based on the gaze position in the screen image; and applying Multi-Resolution-Shading Process to the fourth coordinates in a fourth coordinate system of a plurality of regions of the screen image including the high-resolution region and the plurality of low-resolution regions in the screen image based on the third mapping relationship, thereby obtaining the second coordinates in the second coordinate system of the Multi-Resolution-Shading screen image.

2. The image processing method of claim 1, wherein the third mapping relationship is expressed as:

$$\begin{cases} x' = \dfrac{x * \text{Width} + TopLeftX}{W_{mrs}} \\ y' = \dfrac{y * \text{Height} + TopLeftY}{H_{mrs}} \end{cases};$$

wherein x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a resolution of a region of the Multi-Resolution-Shading image having the pixel, Wmrs and Hmrs represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel.

3. The image processing method of claim 1, wherein determining the gaze position in the screen image comprises:

determining the gaze position in the screen image is performed according to:

$$\begin{cases} o = s(o2 - o1) + t(o3 - o1) \\ o' = s(o2' - o1') + t(o3' - o1') \end{cases};$$

wherein, o is a gaze point of the Multi-Resolution-Shading image, o1、o2、o3 are respective three vertices of a triangular region of the Multi-Resolution-Shading image having o, o' is a gaze point of the screen image, o1'、o2'、o3' are respective three vertices of a triangular region of the screen image where o' locates, s and t are variable parameters.

4. An image processing apparatus, comprising:
a memory;
one or more processors; and
a display apparatus;

wherein the memory and the one or more processors are connected with each other; and the memory stores computer-executable instructions for controlling the one or more processors to:

determine a first mapping relationship between first coordinates in a first coordinate system of a Multi-Resolution-Shading image and second coordinates in a second coordinate system of a Multi-Resolution-Shading screen image;

apply an anti-distortion process to the Multi-Resolution-Shading image based on the first mapping relationship, thereby obtaining an anti-distortion image;

wherein the display apparatus is configured to:

apply an image flattening process to the anti-distortion image thereby obtaining a flattened anti-distortion image; and display the flattened anti-distortion image;

wherein the memory further stores computer-executable instructions for controlling the one or more processors to:

determine a second mapping relationship between third coordinates in a third coordinate system of an original image and fourth coordinates in a fourth coordinate system of a screen image;

determine a third mapping relationship between the third coordinates of the third coordinate system of the original image and the first coordinates of the first coordinate system of the Multi-Resolution-Shading image;

determine a fourth mapping relationship between the first coordinates of the first coordinate system of the Multi-Resolution-Shading image and the fourth coordinates of the fourth coordinate system of the screen image based on the second mapping relationship and the third mapping relationship;

apply a Multi-Resolution-Shading Process to the fourth coordinates in the fourth coordinate system of the screen image based on the third mapping relationship, thereby obtaining the second coordinates in the second coordinate system of the Multi-Resolution-Shading screen image;

determine the first mapping relationship using based on the fourth mapping relationship and the second coordinates of the second coordinate system of the Multi-Resolution-Shading screen image;

determine a gaze position in the screen image;

separate the screen image into a high-resolution region and a plurality of low-resolution regions based on the gaze position in the screen image; and apply Multi-Resolution-Shading Process to the fourth coordinates in a fourth coordinate system of a plurality of regions of the screen image including the high-resolution region and the plurality of low-resolution regions in the screen image based on the third mapping relationship, thereby obtaining the second coordinates in the second coordinate system of the Multi-Resolution-Shading screen image.

5. The image processing apparatus of claim 4, wherein the third mapping relationship is expressed as:

$$\begin{cases} x' = \dfrac{x * \text{Width} + TopLeftX}{W_{mrs}} \\ y' = \dfrac{y * \text{Height} + TopLeftY}{H_{mrs}} \end{cases};$$

wherein x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a resolution of a region of the Multi-Resolution-Shading image having the pixel, Wmrs and Hmrs represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel.

6. The image processing apparatus of claim 4, wherein the memory further stores computer-executable instructions for controlling the one or more processors to determine the gaze position in the screen image is performed according to:

$$\begin{cases} o = s(o2 - o1) + t(o3 - o1) \\ o' = s(o2' - o1') + t(o3' - o1') \end{cases};$$

wherein, o is a gaze point of the Multi-Resolution-Shading image, o1、o2、o3 are respective three vertices of a triangular region of the Multi-Resolution-Shading image having o, o' is a gaze point of the screen image, o1'、o2'、o3' are respective three vertices of a triangular region of the screen image where o' locates, s and t are variable parameters.

7. A virtual reality display apparatus, comprising the image processing apparatus of claim 4.

8. A computer-program product comprising a non-transitory tangible computer-readable medium having computer-readable instructions thereon, the computer-readable instructions being executable by a processor to cause the processor to perform:

determining a first mapping relationship between first coordinates in a first coordinate system of a Multi-Resolution-Shading image and second coordinates in a second coordinate system of a Multi-Resolution-Shading screen image;

applying an anti-distortion process to the Multi-Resolution-Shading image based on the first mapping relationship, thereby obtaining an anti-distortion image;

sending the anti-distortion image to a display apparatus;

determining a second mapping relationship between third coordinates in a third coordinate system of an original image and fourth coordinates in a fourth coordinate system of a screen image;

determining a third mapping relationship between the third coordinates of the third coordinate system of the original image and the first coordinates of the first coordinate system of the Multi-Resolution-Shading image;

determining a fourth mapping relationship between the first coordinates of the first coordinate system of the Multi-Resolution-Shading image and the fourth coordinates of the fourth coordinate system of the screen image based on the second mapping relationship and the third mapping relationship;

applying a Multi-Resolution-Shading Process to the fourth coordinates in the fourth coordinate system of the screen image based on the third mapping relationship, thereby obtaining the second coordinates in the second coordinate system of the Multi-Resolution-Shading screen image; and determining the first mapping relationship using based on the fourth mapping relationship and the second coordinates of the second coordinate system of the Multi-Resolution-Shading screen image;

determining a gaze position in the screen image;

separating the screen image into a high-resolution region and a plurality of low-resolution regions based on the gaze position in the screen image; and applying Multi-Resolution-Shading Process to the fourth coordinates in a fourth coordinate system of a plurality of regions of the screen image including the high-resolution region and the plurality of low-resolution regions in the screen image based on the third mapping relationship, thereby obtaining the second coordinates in the second coordinate system of the Multi-Resolution-Shading screen image.

9. The computer-program product of claim 8, wherein the third mapping relationship is expressed as:

$$\begin{cases} x' = \dfrac{x * \text{Width} + TopLeftX}{W_{mrs}} \\ y' = \dfrac{y * \text{Height} + TopLeftY}{H_{mrs}} \end{cases};$$

wherein x is a horizontal coordinate value of a pixel in third coordinates of the third coordinate system of the original image, y is a vertical coordinate value of a pixel in the third coordinates of the third coordinate system of the original image, x' is a horizontal coordinate value of a pixel in first coordinates of the first coordinate system of the Multi-Resolution-Shading image, y' is a vertical coordinate value of a pixel in the first coordinates of the first coordinate system of the Multi-Resolution-Shading image, Width and Height represent a resolution of a region of the Multi-Resolution-Shading image having the pixel, Wmrs and Hmrs represent a resolution of the Multi-Resolution-Shading image, TopLeftX and TopLeftY are respectively a horizontal coordinate value and a vertical coordinate value of a vertices of a top left corner of the region of the Multi-Resolution-Shading image having the pixel.

10. The computer-program product of claim 8, wherein the computer-readable instructions are executable by a processor to cause the processor to determine the gaze position in the screen image is performed according to $$\begin{cases} o = s(o2 - o1) + t(o3 - o1) \\ o' = s(o2' - o1') + t(o3' - o1') \end{cases};$$

wherein, o is a gaze point of the Multi-Resolution-Shading image, o1、o2、o3 are respective three vertices of a triangular region of the Multi-Resolution-Shading image having o, o' is a gaze point of the screen image, o1'、o2'、o3' are respective three vertices of a triangular region of the screen image where o' locates, s and t are variable parameters.

* * * * *